(12) United States Patent
Verdon

(10) Patent No.: US 6,355,202 B2
(45) Date of Patent: Mar. 12, 2002

(54) METHOD FOR OBTAINING A ZIRCONIA-BASED ARTICLE HAVING A GOLD METALLIC APPEARANCE

(75) Inventor: Christian Verdon, Boussens (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/850,005

(22) Filed: May 8, 2001

(30) Foreign Application Priority Data

May 9, 2000 (CH) ............................................. 0900/00

(51) Int. Cl.[7] .................................................. H05B 6/00
(52) U.S. Cl. ....................................... 264/430; 264/483
(58) Field of Search ................................. 264/430, 483

(56) References Cited

U.S. PATENT DOCUMENTS

| | | | |
|---|---|---|---|
| 5,672,302 A | | 9/1997 | Chatterjee et al. |
| 5,690,887 A | * | 11/1997 | Magnin ........................ 264/430 |
| 5,863,849 A | * | 1/1999 | Magnin ........................ 501/103 |
| 5,928,977 A | * | 7/1999 | Magnin et al. ................ 501/87 |
| 6,270,907 B1 | * | 8/2001 | Michel ........................ 428/469 |

FOREIGN PATENT DOCUMENTS

| | | |
|---|---|---|
| EP | 0 739 865 A1 | 10/1996 |
| EP | 0 850 900 A1 | 7/1998 |
| EP | 0 947 490 A1 | 10/1999 |
| JP | 11-314966 A | 2/2000 |

* cited by examiner

*Primary Examiner*—Christopher A. Fiorilla
(74) *Attorney, Agent, or Firm*—Griffin & Szipl, P.C.

(57) ABSTRACT

A method for obtaining a finished or semi-finished zirconia-based article having a gold metallic external appearance, the method including the steps of: providing at least one zirconia article previously shaped into its finished or semi-finished shape; partially reducing the zirconia forming said article; placing said article in a reaction vessel in which a plasma is generated from ammonia, or a mixture of nitrogen and hydrogen, or a combination of this gas and this mixture; and maintaining the article in the plasma for a period of at least 5 minutes, while adjusting the conditions so that the average temperature of the article is settled between 500 and 900° C.

9 Claims, No Drawings

METHOD FOR OBTAINING A ZIRCONIA-BASED ARTICLE HAVING A GOLD METALLIC APPEARANCE

FIELD OF THE INVENTION

The present invention concerns a method for obtaining a zirconia-based article, particularly a sintered article, and in particular an article whose chemical structure is transformed over part of its thickness in order to give it an external surface having a gold metallic appearance.

BACKGROUND OF THE INVENTION

European Patent No. EP 0 947 490 in the name of the Applicant discloses in particular a method for obtaining a zirconia-based article having a gold metallic appearance. According to this method, a stabilised zirconia article in tetragonal phase is placed into a reaction vessel in which a plasma is created obtained from a gaseous mixture of ammonia and a neutral gas and the article is kept in the plasma for a period of approximately 15 to 240 minutes, adjusting the conditions so that the mean temperature of the article is settled between 600 and 1300° C.

During the treatment, the nitrogen contained in the plasma diffuses in the surface of the ceramic and transforms the tetragonal phase of the zirconia into cubic phase. This phenomenon has already been disclosed in a publication by MM. J. Wrba & L. Lerch in the journal entitled J. Euro-Ceram. Soc. 18 (1998) at pages 1787 to 1793. Although this superficial transformation does not cause any cracking of the zirconia insofar as the cubic phase has the same density as the tetragonal phase, this transformation causes a reduction in its toughness at the surface. Since a certain quantity of nitrogen has to be incorporated in the zirconia to form the zirconium nitride which will provide the desired golden appearance, the detrimental effect of this structural transformation can only be limited by reducing the extent of the space over which it occurs. In order to do this, it is necessary to limit the diffusion of nitrogen in the zirconia. In other words, this means in practice reducing the temperature of the plasma treatment, for example, in the case of a discharge reactor, decreasing the relative quantity of hydrogen in the plasma, by reducing the intensity of the discharge or by moving the parts away from the plasma. By way of illustration, the transformed thickness typically passes from 300 µm for a treatment temperature of 950° C. to 10 µm for a treatment temperature of 600° C.

However, this decrease in temperature has a drawback in that the thickness of the layers of zirconium nitride (ZrN) obtained are very thin and allow the reduced zirconium oxide ($ZrO_{2-x}$) to appear, which detracts considerably from the gold metallic appearance which it is sought to obtain and consequently makes the application of these transformed zirconia for aesthetic and decorative purposes virtually impossible.

SUMMARY OF THE INVENTION

The object of the invention is to overcome the drawbacks of the prior art by providing a method for obtaining a zirconia article allowing layers of ZrN to be formed over a large thickness, typically 300 µm, having an intense gold metallic appearance, as well as good mechanical properties.

The invention therefore concerns a method for obtaining a finished or semi-finished zirconia-based article, the article having a gold metallic external appearance, characterised in that it includes the steps of:

providing at least one zirconia article previously shaped into its finished or semi-finished shape;

partially reducing the zirconia forming said article;

placing said article in a reaction vessel in which a plasma is generated from ammonia, or a mixture of nitrogen and hydrogen, or a combination of this gas and this mixture; and maintaining said article in the plasma for a period of at least 5 minutes, while adjusting the conditions so that the average temperature of the article is settled between 500 and 900° C.

The method of the invention thus allows a sufficiently thick superficial layer of zirconium nitride to be formed, while avoiding the transformation of the zirconia into cubic phase over too large a thickness, as a result of the combination of the prior reduction step and the relatively low temperature plasma treatment (between 500 and 900° C.), this latter treatment being permitted by the prior reduction step.

According to a preferred embodiment of the invention, an inert gas is added to the ammonia, or respectively to the nitrogen and hydrogen mixture.

The addition of an inert gas allows a lower voltage electric arc to be generated favorise in the plasma reactor, which encourages the plasma to arc at a steady mode, in particular in the case of an electric discharge reactor.

According to an advantageous embodiment of the invention, the prior reduction step of said article is performed in a hydrogen plasma.

Thus, it is possible to perform the prior zirconia reduction step in the same reactor as that used to perform the subsequent nitration step, which greatly simplifies the method and decreases the cost thereof.

According to another feature of the invention, the prior reduction step of said article is performed under atmospheric hydrogen pressure, at a temperature comprised between 1100° C. and 1300° C. for approximately 1 to 2 hours.

Other features and advantages of the invention will be better understood with reference to the following description of an implementation example of the method for obtaining a zirconia-based article having a gold metallic external appearance.

DESCRIPTION OF THE INVENTION

By way of example, a zirconia article having a tetragonal crystallographic configuration (zirconium oxide $ZrO_2$), which is white in colour and which is made according to conventional manufacturing techniques for ceramic articles, for example by sintering, is provided as the starting article.

This article may be a finished product having the final shape in which it will be used, for example a part having already undergone mirror polishing and intended to form an external watch part, such as a link of a bracelet.

Of course, if required, the article may be a semi-finished product on which subsequent machining operations could be performed in order to adapt such article to its final use.

The method according to the invention consists first of all in partially reducing the zirconia forming the article in order to obtain by controlled reduction a reduction state gradient between the surface of the article and the core. Within the scope of the description "partial reduction" means that an oxygen sub-stoichiometry of the zirconia is created, namely a compound of the $ZrO_{2-x}$ type.

This partial reduction step is preferably achieved up to the core of the article. This step is for example achieved by a prolonged treatment of the order of one or two hours at a temperature comprised between 1100° C. and 1300° C., typically at 1200° C., and under hydrogen atmospheric pressure. It goes without saying that any other reduction means allowing reduction up to the core of the article may be envisaged by those skilled in the art. The duration of the reduction step will of course depend on the dimensions and the shape of the article or articles to be treated.

This article is then placed into a reaction vessel in which a plasma is generated from the ionisation an ammonia gaseous mixture and if required an inert gas, or a mixture of nitrogen, hydrogen and if required an inert gas, or a combination of these two mixtures. This plasma is obtained for example using an electric discharge. Of course, according to variants of the method of the invention, other means for generating the plasma may be envisaged. By way of example, the plasma may be obtained by radiofrequency (RF) or by microwaves.

According to the method used to obtain the plasma, the use of argon is advantageous. Of course, the use of other inert gases such as neon may also be envisaged.

The article is maintained in the plasma for at least 5 minutes, and preferably between 15 and 240 minutes. The average temperature of the article during treatment is settled between 500 and 900° C. according to the implementation parameters (time, composition of the gaseous mixture, flow rates, etc.) of the method. It will also be noted in this regard that in the event that the energy generated by the plasma is not sufficient for the article to reach a temperature comprised between 500 and 900° C., auxiliary heating means will be used.

After this latter operation, the article has the gold metallic brilliance of zirconium nitride, and its conduction and very high superficial hardness, which is indispensable for obtaining an article which is resistant to wear in normal conditions of use. It will also be noted that this superficial transformation does not significantly affect the toughness of the transformed zirconia. the crystallographic structure of the zirconia is thus superficially transformed into a new crystallographic structure corresponding to that of zirconium nitride, and not an added coating liable to be torn off or to become detached from the surface of the article, in particular when the latter is subjected to significant conditions of wear.

An essential point of the invention is the combination of the plasma reduction step of the article prior to the plasma treatment and the plasma treatment of the article at a relatively low temperature. Indeed, it was observed that forming a superficial layer of ZrN of sufficient thickness and obtaining the desired optical, physical and mechanical properties strictly depended on the state of reduction of the surface zirconium prior to the treatment. In the absence of a prior reduction step, the layers of ZrN which result from the low temperature nitriding of a stoichiometric zirconia (ZrO2) are thus always of very low thickness (several tens of nanometers), which allows the grey colour of the subjacent partially reduced ceramic to appear, as was mentioned hereinbefore. This is why, in accordance with the invention, the method includes an additional step prior to the nitriding step, during which the zirconia is partially reduced. The prior reduction step allows a reduction state gradient to be obtained which allows the layer of zirconium nitride to be formed over a larger thickness, for example over a thickness of the order of 300 nm. Such a zirconia thus has the colour and mechanical resistance properties and in particular satisfactory toughness for articles such as decorative articles.

EXAMPLE 1

Several watch bracelet links, made of white tetragonal zirconia (ZrO2), having a length of 20 mm, a width of 7 mm, and a thickness of 3 mm, are placed in a plasma reaction vessel having a diameter of 700 mm. The zirconia used is a 100% tetragonal zirconia, which is stabilised at the surrounding temperature by adding yttrium oxide (3% mol) and which has toughness typically higher than 5 Mpa.m$^{1/2}$. A mixture of gas including 55% argon (Ar) and 45% hydrogen is injected into the reaction vessel. The flow rate of argon is 1200 sccm and the flow rate of hydrogen is 1000 sccm. The steady mode of the discharge current is fixed at 200 A under 70V. Further, the pressure in the reaction vessel is fixed at 1 millibar. A plasma is generated in a conventional manner between the cathode and the anode which are located in the reaction vessel. The atomic hydrogen then comes into contact with the surface of the links and thus partially reduces the zirconia. During this step of treating the links, the temperature of the latter is settled at approximately 910° C. The treatment lasts for one hour.

A mixture of gas including 75% argon (Ar) and 25% ammonia (NH3) is injected into the reaction vessel. The flow rate of argon is 1200 sccm and the flow rate of ammonia is 410 sccm. The steady mode of the discharge current is fixed at 80 A under 82V. Further, the pressure in the reaction vessel is fixed at 1 millibar. A plasma is generated in a conventional manner between the cathode and the anode which are located in the reaction vessel. The ionised gas mixture then comes into contact with the already partially reduced links and the atomic nitrogen of the plasma is substituted for the oxygen of the zirconia. The hydrogen present in the reaction vessel acts as a catalyst for this reaction and prevents re-oxidisation of the zirconia. During this treatment step of the links, the temperature in the reaction vessel is settled at approximately 770° C. The treatment lasts for two hours. The links are then removed from the reaction vessel and subjected to analysis. The observation of cross-sections of these links under an electronic transmission microscope shows that part of the surface of the links has been transformed into zirconium nitride (ZrN) over a depth of approximately 250 nm. The hardness of the treated links has also been measured. The Vickers hardness values obtained are of the order of 12 Gpa. The links obtained have a gold metallic appearance very close to that of gold. It will also be noted that the thickness of the cubic phase zirconia transformation after treatment is of the order of 18 $\mu$m, the thickness of this phase being directly linked to the temperature of the ceramic during treatment.

EXAMPLE 2

A white tetragonal zirconia watch case is arranged as described in example 1 in a plasma reaction vessel. The case is of generally rectangular shape and has a length of 30 mm, a width of 24 mm and a height of 5 mm. This case is hollowed at its centre. The operating process is identical to that described in example 1, with the difference that the prior zirconia reduction step is performed in a controlled atmosphere furnace in which a hydrogen flow of 100 sccm flows at 1200° C. for two hours and during the nitriding step the gas mixture used includes 55% nitrogen, 34% hydrogen and 11% argon. The flow rate of argon is 1200 sccm, the flow rate of nitrogen is 250 sccm and the flow rate of hydrogen is 750 sccm. The steady mode of the discharge current is fixed at 50 A under 90V. In this example, the temperature in the reaction vessel is settled at approximately 670° C. during the treatment. The treatment lasts two hours. The watch cases obtained have a gold metallic appearance similar to that of the links described previously, and have the same transformation and hardness features as those described in example 1.

As a result of the foregoing, the method according to the invention allows articles, particularly decorative articles, with a gold metallic appearance, to be made, combining certain features of ceramics and metals.

It is thus possible to obtain decorative articles which have substantially the mechanical properties of tetragonal zirconia and in particular its toughness, while having a particularly pleasing appearance and metallic brilliance. These articles are perfectly suited to use as decorative articles and in particular as construction elements for wristbands or cases for timepieces.

What is claimed is:

1. A method for obtaining a finished or semi-finished zirconia-based article, the article having a gold metallic external appearance, including the steps of:

providing a zirconia article previously shaped into its finished or semi-finished shape;

partially reducing the zirconia forming said article;

after partially reducing the zirconia forming said article, placing said article in a reaction vessel in which a plasma is generated from ammonia gas, or a mixture of nitrogen and hydrogen, or a combination of said gas and said mixture; and maintaining said article in the plasma for a period of at least 5 minutes, while adjusting conditions so that the average temperature of the article is settled between 500 and 900° C.

2. A method according to claim 1, wherein an inert gas is added to the ammonia, or to the mixture of nitrogen and hydrogen.

3. A method according to claim 1, wherein the reduction step of said article is performed in a hydrogen plasma or a plasma of a mixture of hydrogen and an inert gas.

4. A method according to claim 1, wherein the reduction step of said article is performed in the presence of hydrogen at a temperature of between 1100° C. and 1300° C. for a period of time of between 1 and 2 hours.

5. A method according to claim 2, wherein the inert gas is argon.

6. A method according to claim 1, wherein said plasma is generated by a DC discharge.

7. A method according to claim 1, wherein the adjustment of the conditions of said plasma includes the use of auxiliary heating means.

8. A method according to claim 1, wherein said article includes a core and the partial reduction step is performed to reduce said article up to said core.

9. A method according to claim 1, wherein the article is maintained in said plasma for a period of time of between 15 and 240 minutes.

* * * * *